United States Patent
Kyomoto et al.

(10) Patent No.: US 11,111,367 B2
(45) Date of Patent: Sep. 7, 2021

(54) RESIN MOLDED BODY AND METHOD FOR PRODUCING RESIN MOLDED BODY

(71) Applicants: KYOCERA Corporation, Kyoto (JP); The University of Tokyo, Tokyo (JP)

(72) Inventors: Masayuki Kyomoto, Kyoto (JP); Kazuhiko Ishihara, Tokyo (JP)

(73) Assignees: KYOCERA CORPORATION, Kyoto (JP); THE UNIVERSITY OF TOKYO, Tokyo (JP)

( * ) Notice: Subject to any disclaimer, the term of this patent is extended or adjusted under 35 U.S.C. 154(b) by 97 days.

(21) Appl. No.: 16/489,370

(22) PCT Filed: Mar. 20, 2018

(86) PCT No.: PCT/JP2018/011224
§ 371 (c)(1),
(2) Date: Aug. 28, 2019

(87) PCT Pub. No.: WO2018/174108
PCT Pub. Date: Sep. 27, 2018

(65) Prior Publication Data
US 2020/0190298 A1 Jun. 18, 2020

(30) Foreign Application Priority Data
Mar. 21, 2017 (JP) .............................. JP2017-054329

(51) Int. Cl.
C08L 23/06 (2006.01)
C08L 33/10 (2006.01)
C08L 43/02 (2006.01)
C08L 23/12 (2006.01)

(52) U.S. Cl.
CPC ............... *C08L 23/06* (2013.01); *C08L 23/12* (2013.01); *C08L 33/10* (2013.01); *C08L 43/02* (2013.01); *C08L 2207/14* (2013.01)

(58) Field of Classification Search
USPC .................. 525/240; 528/271, 272, 273, 274
See application file for complete search history.

(56) References Cited

U.S. PATENT DOCUMENTS

| | | | |
|---|---|---|---|
| 2004/0243249 A1 | 12/2004 | Ishihara et al. | |
| 2008/0213460 A1 | 9/2008 | Benter et al. | |
| 2019/0345316 A1* | 11/2019 | Kyomoto | ................ C08L 23/06 |

FOREIGN PATENT DOCUMENTS

| | | |
|---|---|---|
| JP | 08-000723 A | 1/1996 |
| JP | 2870727 B2 | 1/1999 |
| JP | 2003-310649 A | 11/2003 |
| JP | 2005-006704 A | 1/2005 |
| JP | 2008-527117 A | 7/2008 |
| JP | 2010-059219 A | 3/2010 |
| JP | 2014-004352 A | 1/2014 |
| JP | 2015-084848 A | 5/2015 |

* cited by examiner

*Primary Examiner* — Terressa Boykin
(74) *Attorney, Agent, or Firm* — Volpe Koenig

(57) ABSTRACT

A resin molded body includes: a polyolefin element formed of polyolefin, including a crystalline region and an amorphous region; and a hydrophilic copolymer contained in at least part of a surface of the polyolefin element, the hydrophilic copolymer including a copolymer of 2-methacryloyloxyethyl phosphorylcholine (MPC) of 45% or greater on a mole fraction basis and at least one other monomer. In the resin molded body, the MPC polymer is immersed through the surface by applying heat treatment.

14 Claims, 1 Drawing Sheet amorphous   lamella

PMBBP layer

PMBBP layer

RESIN MOLDED BODY AND METHOD FOR PRODUCING RESIN MOLDED BODY

CROSS-REFERENCE TO RELATED APPLICATIONS

This application is a national stage entry according to 35 U.S.C. 371 of International Application No. PCT/JP2018/011224 filed on Mar. 20, 2018, which claims priority to Japanese Patent Application No. 2017-054329 filed on Mar. 21, 2017, the contents of which are entirely incorporated herein by reference.

TECHNICAL FIELD

The present disclosure relates to a resin molded body that maintains the water-aided slidability of the surface of a sliding member satisfactorily for a long period of time, and a method for producing a resin molded body.

BACKGROUND

Japanese Examined Patent Publication No. JP-B2 2870727 (Patent Literature 1) discloses the use of a copolymer containing a compound having a phosphorylcholine group such as 2-methacryloyloxyethyl phosphorylcholine (MPC) (MPC-containing copolymer, which will hereafter be referred to as "MPC polymer") for a surface coating on a medical instrument which is placed in the human body for a long period of time, such as a urethral catheter.

Moreover, Japanese Unexamined Patent Publication JP-A 2015-84848 (Patent Literature 2) discloses, as a technique for applying a coating of the aforenamed MPC polymer, a method for coating a medical resin molded body, including a process of plasma-treating a resin molded body, and a process of repeating a cycle of soaking (dipping) the plasma-treated resin molded body into an ethanol solution of MPC-n-butyl methacrylate copolymer (MPC polymer-containing solution) and drying the resin molded body a given number of times.

A compound having a phosphorylcholine group and a polymer of such a compound as described above are similar in chemical structure to a cell that constitutes a living tissue, and have high affinity for the living body accordingly. Thus, even if such a substance is frictionally chipped, the resultant particles are not likely to do harm to the human body.

SUMMARY

A resin molded body according to the disclosure includes: a polyolefin element formed of polyolefin, including a crystalline region and an amorphous region; and a hydrophilic copolymer contained in at least part of a surface of the polyolefin element and in part of the amorphous region which part is located below the surface, the hydrophilic copolymer including a copolymer of 2-methacryloyloxyethyl phosphorylcholine of 45% or greater on a mole fraction basis and at least one other monomer. The hydrophilic copolymer of the disclosure includes a copolymer containing a compound having a phosphorylcholine group such as 2-methacryloyloxyethyl phosphorylcholine (MPC) (MPC-containing copolymer) and an MPC polymer.

Moreover, a method for producing a resin molded body according to the disclosure includes the steps of:

preparing a polyolefin element formed of polyolefin, the polyolefin element including a crystalline region and an amorphous region;

forming a coating of a hydrophilic copolymer, the hydrophilic copolymer including a copolymer of 2-methacryloyloxyethyl phosphorylcholine of 45% or greater on a mole fraction basis and at least one other monomer, on at least part of a surface of the polyolefin element; and applying heat treatment to the polyolefin element on which the coating of the hydrophilic copolymer is formed, wherein by applying the heat treatment, the coating of the hydrophilic copolymer is immersed through the surface into part of the amorphous region located below the surface.

DETAILED DESCRIPTION

The following describes an embodiment of the disclosure.

A resin molded body according to the present embodiment includes a polyolefin element formed of polyolefin, including a crystalline region and an amorphous region, and a hydrophilic copolymer contained in at least part of a surface of the polyolefin element, and in part of the amorphous region which part is located below the surface, wherein the hydrophilic copolymer includes a copolymer of 2-methacryloyloxyethyl phosphorylcholine of 45% or greater on a mole fraction basis and at least one other monomer.

The resin molded body according to the embodiment is used for a surface coating for a medical instrument which is placed in the human body for a long period of time, such for example as an artificial joint, an artificial bone, an artificial blood vessel, an artificial valve, a hemodialysis membrane, a stent, a catheter, an encapsulating material, an intraocular lens, and a contact lens. With such uses in mind, the resin molded body is configured to have high biological compatibility so as not to induce abnormal immune response in a living body. Note that the range of medical instruments to which the disclosure is applicable is not limited to the aforenamed examples.

Figure 1A:
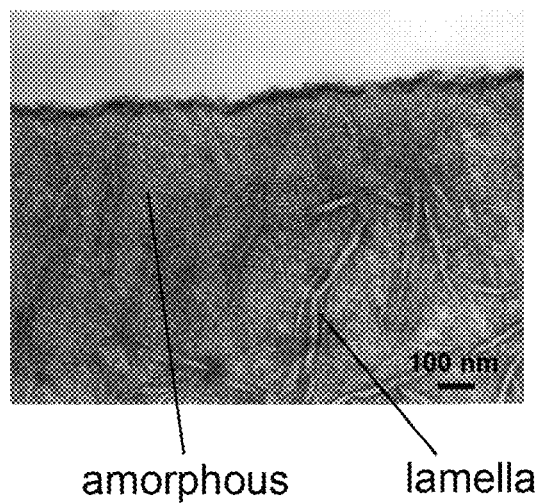
FIG. 1A is an image of the section of a resin-made base material in an initial state thereof (yet-to-be-treated base material)
Figure 1B:
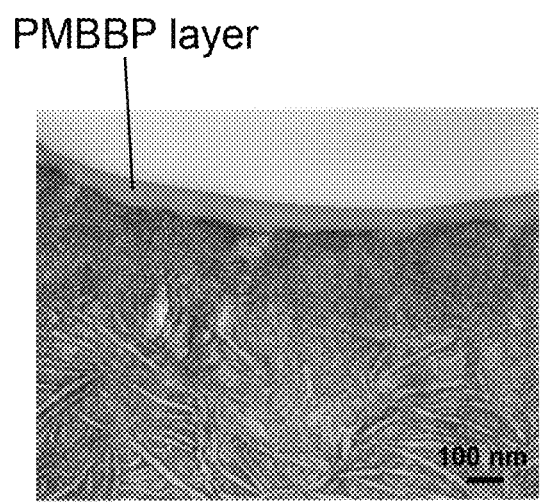
FIG. 1B is an image of the section of the resin-made base material having an MPC polymer layer formed on a surface thereof.
Figure 1C:
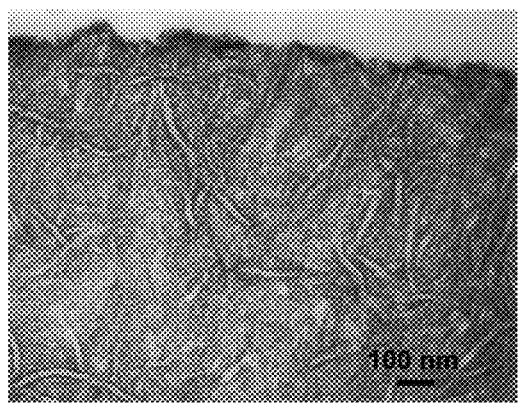
FIG. 1C is an image of the section of part of the base material near the surface thereof as observed after heat treatment.
Figure 1D:
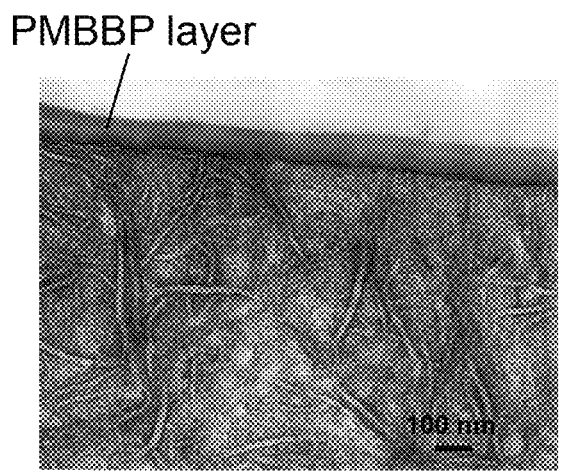
FIG. 1D is an image of the section of the resin-made base material, on the surface of which an MPC polymer layer is formed once again after the heat treatment.

FIG. 1A is an image (TEM image) showing the section of part of a resin (Cross-Linked Polyethylene, which will hereafter be referred to as "CLPE")-made base material in an untreated state (initial state) near the surface thereof taken by a transmission electron microscope (TEM), and, FIG. 1B is a TEM image showing the section of the CLPE-made base material having an MPC polymer (hereafter referred to as "PMBBP") layer formed on a surface thereof by a coating process. FIG. 1C is a TEM image showing the section of part of the base material near the surface thereof formed with the MPC polymer layer, as seen after heat treatment (heating temperature: 120° C., duration time: 2 hours), and, FIG. 1D is a TEM image showing the section of the CLPE-made base material, on the surface of which an MPC polymer layer is formed once again after the heat treatment.

The production of the resin molded body according to the embodiment (indefinite in shape) starts with the formation of a layer of MPC polymer (hydrophilic copolymer) typified by PMBBP (MPC-BMA-BPMA copolymer) on the outer surface of a base material formed of relatively hard polyolefin (hereafter simply referred to as "base material", refer to FIG. 1A) as shown in the TEM image of FIG. 1B. After that, heat treatment is applied to impregnate the base material with the MPC polymer layer, and eventually, the MPC polymer infiltrating in the base material seemingly disappears from sight as shown in FIG. 1C.

In the resin molded body in the state as shown in FIG. 1C, the presence of the hydrophilic copolymer inside the outer surface of the base material may be checked by conducting surface analysis using X-ray photoelectron spectroscopy (XPS) or near-surface section analysis using TEM and Energy-dispersive X-ray spectroscopy (EDS). By applying the heat treatment, the hydrophilic copolymer is immersed in the base material through the outer surface thereof so as to reach a depth of 1000 nm or less, at a maximum, below the outer surface, depending on the chemical composition and the average molecular weight of the hydrophilic copolymer, the conditions set for the heat treatment, etc.

Moreover, although it may be somewhat difficult to see from the TEM image of FIG. 1C, in addition to the occurrence of immersion of the MPC polymer layer, part of the region inside the outer surface of the base material (part of the interior of the base material) changes into a mixed layer including a lamellar crystal-containing crystalline region and an amorphous region by applying the heat treatment.

Examples of polyolefin constituting the base material include polyethylene and polypropylene. In particular, ultrahigh-molecular-weight polyethylene having a weight-average molecular weight Mw of at least 3 million is preferable for use as the constituent of the base material. It is more preferable to use CLPE obtained by applying cross-linking treatment to ultrahigh-molecular-weight polyethylene under high-energy radiation (for example, X-ray irradiation, gamma-ray irradiation, or electron-beam irradiation).

Examples of the hydrophilic copolymer constituting an MPC polymer layer (hydrophilic coating) include PMB 50 (a copolymer of MPC and BMA 50:50 ratio by mole fraction) PMB 60 (a copolymer of MPC and BMA 60:40 ratio by mole fraction), PMB 70 (a copolymer of MPC and BMA 70:30 ratio by mole fraction), PMB 80 (a copolymer of MPC and BMA 80:20 ratio by mole fraction), and PMB 90 (a copolymer of MPC and BMA 90:10 ratio by mole fraction), each having a repeating unit as expressed by the general formula (1) as described later.

It is also possible to use a mixture of each such hydrophilic copolymer and PMB 30 (a copolymer of MPC and BMA 30:70 ratio by mole fraction) or PMB 40 (a copolymer of MPC and BMA 40:60 ratio by mole fraction).

Each of the PMB 30, PMB 40, PMB 50, PMB 60, PMB 70, PMB 80, and PMB 90 may be used as a hydrophilic copolymer for forming "second hydrophilic coating" as described later (an additional hydrophilic coating to be formed on the surface of the base material which has already been impregnated with the hydrophilic coating). PMB 30 to PMB 90, which constitute the second hydrophilic coating, may be used singly (alone) or in combination.

Moreover, as the hydrophilic copolymer constituting the MPC polymer layer (hydrophilic coating), for example, it is possible to use PMBBP 60 (which is, as exemplified, a copolymer of MPC, BMA, and BPMA 60:30:10 ratio by mole fraction), PMBBP 70 (a copolymer of MPC, BMA, and BPMA 70:20:10 ratio by mole fraction), and PMBBP 90 (a copolymer of MPC, BMA, and BPMA 90:5:5 ratio by mole fraction), each having a repeating unit as expressed by the general formula (2) as described later.

As the hydrophilic copolymer constituting the MPC polymer layer (hydrophilic coating), for example, it is also possible to use a hydrophilic copolymer obtained from the copolymerization of MPC of 45% or greater but less than 100% on a mole fraction basis with other monomer compound, such as PMBBPH 80 (a copolymer of MPC, BMA, and BPHMA 80:10:10 ratio by mole fraction) having a repeating unit as expressed by the general formula (3) as described later, or PMBPH 90 (a copolymer of MPC and BPHMA 90:10 ratio by mole fraction) or PMBPH 95 (a copolymer of MPC and BPHMA 95:5 ratio by mole fraction) having a repeating unit as expressed by the general formula (4) as described later. Moreover, it is possible to use a mixture of each such copolymer and PMB having a repeating unit as expressed by the general formula (1).

General Formula (1) PMB

[CHEMICAL 1]

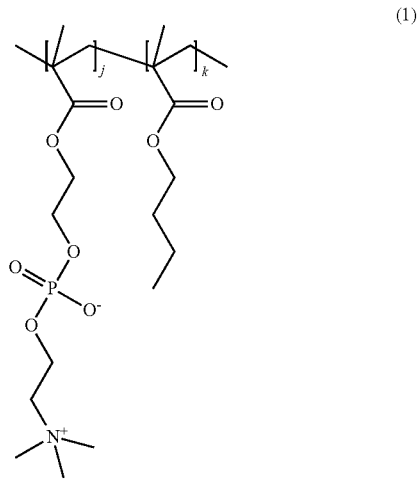

(1)

In the formula (1), (j:k) represents a ratio of (5:5) to (9:1), for example.

General Formula (2) PMBBP

[CHEMICAL 2]

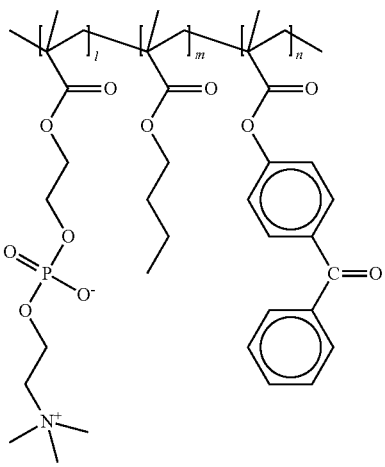

(2)

In the formula (2), (l:m:n) represents a ratio of (60:30:10) to (90:5:5), for example.

General Formula (3) PMBBPH

[CHEMICAL 3]

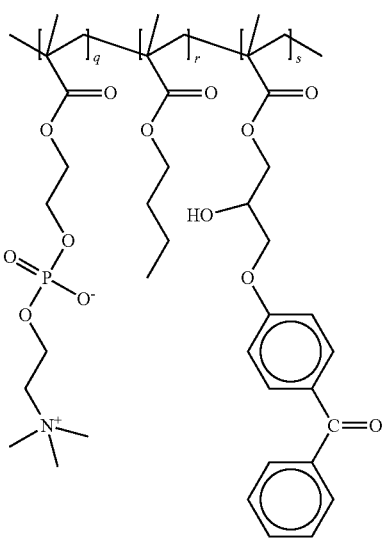

(3)

In the formula (3), (q:r:s) represents a ratio of (60:30:10) to (90:5:5), for example.

General Formula (4) PMBPH

[CHEMICAL 4]

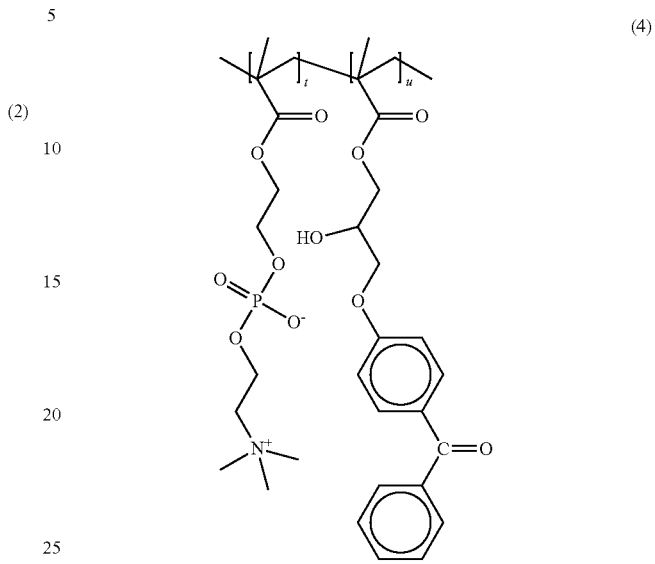

(4)

In the formula (4), (t:u) represents a ratio of (80:20) to (99:1), for example.

As the hydrophilic copolymer, for example, in the interests of harmlessness and safety for human body, it is possible to use an uncrosslinked phospholipid polymer-containing copolymer having a weight-average molecular weight Mw of a million or less, or preferably Mw of 600000 or less, or more preferably Mw of 200000 or less. In this embodiment, PMBBP 60 was selected for use as the hydrophilic copolymer on account of to utilization track records thereof in the field of catheter, for example.

Of the constituents of the hydrophilic copolymer, namely MPC and at least one other monomer, MPC normally accounts for 45% or greater but less than 100%, on a mole fraction basis, of the copolymer. The hydrophilic copolymer is preferably of a type in which MPC accounts for 45% or greater but 90% or less, on a mole fraction basis, of the copolymer, as exemplified by PMB 50, PMB 90, PMBBP 90, PMBPH 90, or PMBPH 95, or more preferably of a type in which MPC accounts for 60% or greater but 80% or less, on a mole fraction basis, of the copolymer, as exemplified by PMB 60, PMB 70, PMB 80, PMBBP 60, PMBBP 70, or PMBBPH 80 that are highly immersible in the base material.

Examples of other monomers that are copolymerized with MPC include monomers of methacrylate ester, e.g. a group (X) of methyl methacrylate, BMA, BPMA, ethyl methacrylate phosphate, 2-hydroxypropyl methacrylate, 2,3-dihydroxypropyl methacrylate, BPHMA, 4-dihydroxybutyl methacrylate, 2-hydroxyethyl methacrylate, sulfobetaine methacrylate, carboxybetaine methacrylate, and ω-oligoethylene glycol monomethacrylate. One or more monomers selected from the group may be used in combination with MPC.

A method for producing the resin molded body thus structured includes (1) a step of preparing a polyolefin element formed of polyolefin, including a crystalline region and an amorphous region, (2) a step of forming a coating of a hydrophilic copolymer, which includes a copolymer of 2-methacryloyloxyethyl phosphorylcholine of 45% or greater on a mole fraction basis and at least one other monomer, on at least part of a surface of the polyolefin element, and (3) a step of applying heat treatment to the polyolefin element on which the coating of the hydrophilic copolymer is formed, wherein by applying the heat treatment, the coating of the hydrophilic copolymer is immersed through the surface into part of the amorphous region located below the surface.

More specifically, a base material is prepared first as a target for a coating process (such as a catheter body), and in addition, a solution of MPC polymer (varnish) is prepared for use in a coating or dipping process for the base material. The MPC polymer solution is prepared by dispersing 0.1 to 1.0 wt % of MPC polymer in a solvent such as methanol (Me-OH), ethanol, propanol, t-butanol, benzene, toluene, dimethylformamide, tetrahydrofuran (THF), chloroform, or a mixture of such substances. The concentration of the MPC polymer solution preferably ranges from 0.2 wt % to 0.5 wt %.

Next, for example, where a CLPE-made base material is used, as shown in the TEM image of FIG. 1B, a resin layer formed of a hydrophilic copolymer (a coating of a hydrophilic copolymer) is formed on the surface of the base material by Process (I) of dipping the base material in the MPC polymer solution so prepared for a duration of a few seconds to a few minutes, or Process (II) of applying the MPC polymer solution in a predetermined thickness to the surface of the base material with a coater or a spray, for example. The resin layer formed of the hydrophilic copolymer such as PMBBP (the coating of the hydrophilic copolymer) has a very smooth surface (with an average surface roughness of 1 nm or less). The procedure given above exemplifies the step of forming a coating of a hydrophilic copolymer, which includes a copolymer of 2-methacryloyloxyethyl phosphorylcholine of 45% or greater on a mole fraction basis and at least one other monomer, on at least part of the surface of the polyolefin element.

Then, in an environment where neither the base material (CLPE) nor the MPC polymer (such as PMBBP) becomes soluble, more specifically, in a vacuum, in the presence of inert gas, or in a solvent in which both the base material and the MPC polymer become insoluble, heat treatment is applied at a temperature which is higher than or equal to a temperature at which minute crystal contained in the base material starts to melt (temperature in a range of 60° C. to 90° C.) but lower than or equal to the melting temperatures of the base material and the MPC polymer (temperature of about 120° C. in this example) to impregnate the base material with the MPC polymer constituting the hydrophilic coating. At this time, ideally, on the surface of the base material, a covalent bond is formed between the hydrophobic terminal of the hydrophilic coating and the base material (CLPE) in the treatment (heating) target region. This causes the hydrophilic group of the hydrophilic copolymer to be lopsidedly present toward the surface of the base material. The procedure given above exemplifies the step of applying heat treatment to the polyolefin element on which the coating of the hydrophilic copolymer is formed.

As shown in FIG. 1C, after the immersion of the MPC polymer as described above, the outer surface within the treatment (heating) target region has a rough surface (average surface roughness of about 5 nm) with the hydrophilic coating partly remaining thereon. The result of a surface hydrophilicity (hydrophobicity) evaluation in the target region showed that the static contact angle of atmospheric water with respect to the target region ranges from 1 to 25 degrees.

The average surface roughness was determined on the basis of image data obtained by carrying out a surface measurement on a test sample having an area of 1 $\mu m^2$ under an atomic force microscope (NanoScope IIIa manufactured by Veeco Instruments Inc.) with a single-crystal silicon cantilever in a dry environment, with scan rate set at 0.25 Hz and chip rate set at 5 µm per second.

Moreover, an evaluation of the static contact angle of water was conducted with Sessile drop method using surface contact angle measuring equipment (Contact angle meter DM300 manufactured by Kyowa Interface Science Co. Ltd). In the measurement of static surface contact angle using the Sessile drop method, in conformity with ISO 15989 standards, pure water in an amount of 1 µL on a droplet basis has been dropped on the surface of the test sample in the atmosphere, and, after a lapse of 60 seconds, the contact angle was measured.

According to the above-described structure, the resin molded body according to the embodiment has a surface exhibiting greater affinity for water without formation of a water-containing soft hydrogel layer like a conventional MPC polymer coating. This allows the surface of the resin molded body to inherit scratching resistance (strength) from the base material in itself constituting the resin molded body, and consequently, the resin molded body is far greater in damage resistance than a conventional resin molded body having a hydrogel layer left exposed on an outer surface (this effect is verified in "Example 1" as described later) thereof.

That is, in the resin molded body according to the embodiment, immediately after the heat-induced immersion of the hydrophilic copolymer serving as a surface treatment material (absorbate), or equivalently the hydrophilic copolymer obtained from the copolymerization of 2-methacryloyloxyethyl phosphorylcholine (MPC) of 45% or greater but less than 100% on a mole fraction basis with other monomer, the hydrophilic copolymer remains infiltrated in the base material (polyolefin-made base material). Thus, on the surface of the resin molded body in an initial state (unused resin molded body in storage) thereof, there is little material which is relatively soft and prone to being damaged (hydrophilic copolymer layer or hydrogel layer derived from hydrophilic copolymer). This allows the resin molded body to exhibit high resistance to external damage such as scratching.

After the resin molded body according to the embodiment is shifted to watery surroundings, the hydrophilic copolymer immersed inside the treatment (heating) target region gradually moves from the amorphous region (layer) lying under the target region toward the surface, and eventually appears on the surface damaged as described above so as to fill in a damaged hydrophilic copolymer-derived hydrogel layer, with the consequent formation of a hydrophilic thin film (layer) on the surface. Thus, in the resin molded body according to the embodiment in watery surroundings, the damage such as a scratch on the surface of the resin molded body is automatically repaired to some extent, and also, the amount of hydration increases in the treatment target region of the resin molded body surface, and the degree of slidability (lubricity) of the resin molded body surface increases correspondingly. In addition, the supply of the hydrophilic copolymer from the amorphous region onto the surface does not proceed at once but progresses gradually and slowly. Thus, in the resin molded body according to the embodiment, the water content and the hydrogel layer in the treatment target region of the surface are maintained with stability for a long period of time.

With use of the resin molded body according to the embodiment for a surface coating for a medical instrument which is placed in the human body for a long period of time, such as an artificial joint, an artificial bone, an artificial blood vessel, an artificial valve, a stent, a catheter, an encapsulating material, an intraocular lens, or a contact lens, it is possible to impart high resistance to external damage such as scratching to the surface coating, and thereby handle the surface coating without exercising much care to avoid damage. It is also possible to reduce the number of product replacements due to a problem such as defectiveness resulting from damage arising prior to product placement in a living body, and thereby improve the yields of coated products.

Moreover, in the resin molded body according to the embodiment, when it is made to have another similar MPC polymer layer (hydrophilic copolymer coating) subsequently formed outside an outer surface (refer to FIG. 1D) thereof, even on loss of this subsequently formed MPC polymer layer caused by, for example, wear or friction, as long as the resin molded body exists in watery surroundings, the MPC polymer which has been immersed in the amorphous region under heat is supplied onto the surface, with the consequent compensation for the decrease of the MPC polymer layer (this effect is verified in "Example 2" as described later).

Thus, in the resin molded body according to the embodiment made to have a coating of a hydrophilic material formed of a hydrophilic copolymer or other hydrophilic resin formed outside an outer surface thereof, even if lubricity derived from the coating of the hydrophilic material and water contained in the coating, or antifouling performance in a living body such as prevention of clot formation, prevention of protein adsorption, prevention of lipid accretion, and prevention of bacteria adhesion, is impaired due to wear and tear, sliding motion, etc., such capabilities can be autonomously restored afterwards. That is, the resin molded body has a self-repairing function.

In the embodiment, the mole fraction of MPC in the hydrophilic copolymer material constituting the subsequently formed MPC polymer layer (the second hydrophilic copolymer coating as shown in FIG. 1D) is not limited to 45% or greater. It is possible to use a hydrophilic copolymer in which the mole fraction of MPC is less than 45%, a mixture of such copolymers, or a hydrophilic material of different type. The above-described subsequently formed MPC polymer layer exemplifies "a coating formed of a hydrophilic material formed on the surface of the polyolefin element".

EXAMPLES

The following describes examples intended to make an assessment as to the performance capabilities (properties) of the resin molded body according to the disclosure.

In Examples, after the preparation of a resin molded body formed of a polyolefine (CLPE)-made base material impregnated with a hydrophilic copolymer (PMB, PMBBP, PMBBPH, PMBPH, etc.) serving as a surface treatment material, heat treatment was applied thereto so that the hydrophilic copolymer was immersed in the base material, and then, another hydrophilic coating (the second hydrophilic coating in soft hydrogel form) was formed on the outer surface of the resin molded body. After the scraping of the second hydrophilic coating, the resin molded body was evaluated for resistance to scratching and surface hydrophilicity on the basis of the result of measurement of variation in scratching resistance (erosion rate) and variation in surface hydrophilicity as an alternative to lubricity (water contact angle) under various measurement conditions.

As the hydrophilic copolymer constituting the hydrophilic coating, in Example 1, three different copolymers were used, namely PMBBP 60 ((l:m:n)=(60:30:10) in the general formula (2)), PMBBP 70 ((l:m:n)=(70:20:10)), and PMBBP 90 ((l:m:n)=(90:5:5)).

Moreover, as the hydrophilic copolymer constituting the hydrophilic coating, in Example 2, only PMBBPH 80 ((q:r:s)=(80:10:10) in the general formula (3)) was used, and, in Example 3, two different copolymers were used, namely PMBPH 90 ((t:u)=(90:10) in the general formula (4)) and PMBPH 95 ((t:u)=(95:5)).

Moreover, as the hydrophilic copolymer constituting the hydrophilic coating, in Example 4, five different copolymers were used, namely PMB 50 ((j:k)=(5:5) in the general formula (1)), PMB 60 ((j:k)=(6:4)), PMB 70 ((j:k)=(7:3)), PMB 80 ((j:k)=(8:2)), and PMB 90 ((j:k)=(9:1)). In addition, it was possible to use that one of PMB mixtures as described above in which the total mole fraction of MPC in the copolymer was 45% or greater, for example, PMB 80/30 (a mixture of PMB 80 and PMB 30 in a ratio of 3:7, the MPC mole fraction of which as observed after the copolymer mixing process was 45%).

The scratching resistance was determined on the basis of the result of erosion rate evaluation using Micro Slurry-jet Erosion Tester (MSE-A) manufactured by Palmeso Co., Ltd. More specifically, with the tester, a jet of water was applied alone at an air-flow rate of 6.0 L per minute and at a water-flow rate of 125 mL per minute, and, a digging depth (nm) at which the jet of water dug into the surface per second (water of 2.08 g) was measured to determine an erosion depth (nm/sec) from which the scratching resistance was derived.

Example 1

Step (1-1) Preparation

A polyolefin base material was prepared by machining a base material formed of CLPE (cross-linked polyethylene (GUR 1020) manufactured by Celanase Corporation) having a weight-average molecular weight Mw of about 3.5 million (obtained through cross-linking treatment under gamma-ray irradiation at 50 kGy) into a predetermined form (refer to TEM image of FIG. 1A). Inside the surface of the base material, an amorphous region (layer) was observed which reached a depth of about 200 nm below the surface as a result of the collapse of lamellar crystal due to the machining operation.

Step (1-2) Preparation

Moreover, as a compound used as a raw material for a hydrophilic coating, a dipping solution was prepared by dispersing and dissolving 0.5 wt %-equivalent amount of PMBBP in a solvent (ethanol).

Step (2) Formation of First Hydrophilic Coating

The base material was dipped in the dipping solution for 10 seconds, then raised out of the solution, and air-dried at room temperature. This cycle of operation was repeated twice to form a PMBBP layer (about 100 nm in layer thickness), which became the first hydrophilic coating (for impregnation), on the surface of the base material (refer to the TEM image of FIG. 1B).

Step (3) Immersion of First Hydrophilic Coating

In the presence of inert gas (nitrogen gas), heat treatment was applied at a temperature of 120° C. for 2 hours so that the PMBBP layer was immersed in the base material through the surface thereof (refer to the TEM image of FIG. 1C). After the heat treatment, while there was no sign of the PMBBP layer formed (laminated) on the surface of the base material, the growth of a lamellar crystal region which was 100 to 400 nm in length and 10 to 30 nm in thickness (looked like a streaky folded-layer structure in the TEM sectional images) was recognized near the base material surface.

Step (4) Formation of Second Hydrophilic Coating

After the immersion (disappearance) of the PMBBP layer, on the surface of the base material (above the first hydrophilic coating), another PMBBP layer (about 100 nm in layer thickness), which became the second hydrophilic coating, was formed by the same process as that to form the first hydrophilic coating (dipping). Then, cross-links were formed between the base material and the hydrophilic coating, as well as the interior of the hydrophilic coating, under a 10-minute irradiation of ultraviolet light with a wavelength of 254 nm (refer to the TEM image of FIG. 1D).

Step (5) Removal of Second Hydrophilic Coating

On the assumption that the second hydrophilic coating showed signs of wear-caused damage or wear and tear, the second hydrophilic coating was scraped off the base material surface with a metallic wire or the like.

Step (6) Reproduction of Hydrophilic Coating by Soaking in Water

After the removal of the second hydrophilic coating, the base material was soaked in water at a temperature of 70° C. for a week. The result was that the re-emergence of a PMBBP layer believed to be derived from the first hydrophilic coating immersed in the base material (hydrophilic coating having a layer thickness of 30 to 100 nm) was recognized at the base material surface.

The result of measurement of "surface hydrophilicity (water contact angle)" and "scratching resistance (erosion rate)" for each step in Example 1 are listed in "Table 1" and "Table 2".

Example 2

Moreover, one sample was produced as Example 2 in a manner like the operation of experimental implementation of Example 1 as described above, with the replacement of PMBBP with PMBBPH 80. That is, Example 2 differs from Example 1 only in the type of copolymer in use. Although not represented by a TEM image, it was observed that a PMBBPH layer of Example 2 exhibited similar behavior to the counterpart of Example 1 (PMBBP) on the surface of the base material. In addition to the measurement result as to Example 1, the result of measurement of "surface hydrophilicity (water contact angle)" and "scratching resistance (erosion rate)" on the PMBBPH layer of Example 2 is also listed in "Table 1" and "Table 2".

Example 3

Moreover, two different samples were produced as Example 3 in a manner like the operation of experimental implementation of Example 1 as described above, with the replacement of PMBBP with PMBPH (PMBPH 90 and PMBPH 95 described earlier). That is, Example 3 differs from Example 1 only in the type of copolymer in use. Although not represented by a TEM image, it was observed that a PMBPH layer of Example 3 exhibited similar behavior to the counterpart of Example 1 (PMBBP) on the surface of the base material. In addition to the measurement result as to Examples 1 and 2, the result of measurement of "surface hydrophilicity (water contact angle)" and "scratching resistance (erosion rate)" on the PMBPH layer of Example 3 is also listed in "Table 1" and "Table 2".

TABLE 1

| | (Surface hydrophilicity) Water contact angle (degree) | | | | | |
|---|---|---|---|---|---|---|
| Step | PMBBP60 | PMBBP70 | PMBBP90 | PMBBPH80 | PMBPH90 | PMBPH95 |
| (1) Initial state of base material surface | 90 | 90 | 90 | 90 | 90 | 90 |
| (2) After formation of first hydrophilic coating | 55 | 40 | 30 | 30 | 25 | 25 |
| (3) After immersion of first hydrophilic coating | 15 | 15 | 15 | 15 | 15 | 15 |
| (4) After formation of second hydrophilic coating | 55 | 40 | 30 | 30 | 25 | 25 |
| (5) After removal of second hydrophilic coating | 30 | 30 | 30 | 30 | 30 | 30 |
| (6) Re-emergence of hydrophilic coating | 15 | 15 | 10 | 10 | 10 | 10 |

TABLE 2

| | (Scratching resistance) Erosion rate (nm/sec) | | | | | |
|---|---|---|---|---|---|---|
| Step | PMBBP60 | PMBBP70 | PMBBP90 | PMBBPH80 | PMBPH90 | PMBPH95 |
| (1) Initial state of base material surface | 2.5 | 2.5 | 2.5 | 2.5 | 2.5 | 2.5 |
| (2) After formation of first hydrophilic coating | 0.5 | 0.3 | 0.1 | 0.2 | 0.1 | 0.1 |
| (3) After immersion of first hydrophilic coating | 2.5 | 2.5 | 2.5 | 2.5 | 2.5 | 2.5 |
| (4) After formation of second hydrophilic coating | 0.5 | 0.3 | 0.1 | 0.2 | 0.1 | 0.1 |
| (5) After removal of second hydrophilic coating | 2.5 | 2.5 | 2.5 | 2.5 | 2.5 | 2.5 |
| (6) Re-emergence of hydrophilic coating | 0.3 | 0.2 | 0.1 | 0.2 | 0.1 | 0.1 |

As seen from the measurement result given above, in the case of using PMBBP (60 to 90), PMBBPH 80, or PMBPH (90, 95) as a surface treatment material (MPC polymer), immediately after the heat-induced immersion of the MPC polymer (Step (3)), the MPC polymer remains infiltrated in the base material (CLPE). Thus, on the surface of the base material, there is little material which is relatively soft and prone to being damaged (MPC polymer-derived hydrogel layer). This makes is possible to attain high resistance to external damage such as scratching.

After a shift to watery surroundings (Step (6)), the MPC polymer immersed in the base material gradually moves from the amorphous region (layer) lying under the treatment target region toward the surface so as to appear on the surface, forming a hydrophilic thin film (layer) on the surface. In consequence, the resin molded body of each of Examples 1 to 3 exhibits good lubricity once again in the watery surroundings. That is, achievement of hydrophilic coating reproduction enables restoration of self-lubricating properties or antifouling performance in a living body.

Example 4

Step (A) Preparation

As in the case of Example 1, a polyolefin base material was prepared by machining a base material formed of CLPE (cross-linked polyethylene (GUR 1020) manufactured by Celanase Corporation) having a weight-average molecular weight Mw of about 3.5 million (obtained through cross-linking treatment under gamma-ray irradiation at 50 kGy) into a predetermined form. Moreover, as a compound used as a raw material for a hydrophilic coating, a dipping solution was prepared by dispersing and dissolving 0.2 wt %-equivalent amount of each PMB in a solvent (ethanol).

Step (B) Formation of First Hydrophilic Coating

The base material was dipped in the dipping solution for 10 seconds, then raised out of the solution, and air-dried at room temperature. This cycle of operation has been repeated twice to form a PMB layer (about 50 nm in layer thickness), which became the first hydrophilic coating (for impregnation), on the surface of the base material.

Step (C) Immersion of First Hydrophilic Coating

In the presence of inert gas (nitrogen gas), heat treatment was applied at a temperature of 120° C. for 2 hours so that the PMB layer was immersed in the base material through the surface thereof. After the heat treatment, while there was no sign of the PMB layer formed (laminated) on the surface of the base material, the growth of a lamellar crystal region (folded-layer structure) was recognized near the base material surface.

Step (D) Formation of Second Hydrophilic Coating

After the immersion (disappearance) of the PMB layer, on the surface of the base material (above the first hydrophilic coating), another PMB layer (about 50 nm in layer thickness), which became the second hydrophilic coating, was formed by the same process as that to form the first hydrophilic coating (dipping).

Step (E) Removal of Second Hydrophilic Coating

On the assumption that the second hydrophilic coating showed signs of wear-caused damage or wear and tear, the second hydrophilic coating was scraped off the base material surface with a metallic wire or the like.

Step (F) Reproduction of Hydrophilic Coating by Soaking in Water

After the removal of the second hydrophilic coating, the base material has been soaked in water at a temperature of 37° C. for a week. The result was that the re-emergence of a PMB layer believed to be derived from the first hydrophilic coating immersed in the base material (hydrophilic coating having a layer thickness of about 10 to 30 nm) was recognized at the base material surface.

The result of measurement of "surface hydrophilicity (water contact angle)" and that of "scratching resistance (erosion rate)" for each step in Example 4 are listed in "Table 3" and "Table 4", respectively.

TABLE 3

| Step | (Surface hydrophilicity) Water contact angle (degree) | | | | | |
|---|---|---|---|---|---|---|
| | PMB50 | PMB60 | PMB70 | PMB80 | PMB90 | PMB80/30 |
| (A) Initial state of base material surface | 90 | 90 | 90 | 90 | 90 | 90 |
| (B) After formation of first hydrophilic coating | 60 | 45 | 30 | 10 | 10 | 70 |
| (C) After immersion of first hydrophilic coating | 15 | 15 | 15 | 15 | 15 | 15 |
| (D) After formation of second hydrophilic coating | 60 | 45 | 30 | 10 | 10 | 70 |
| (E) After removal of second hydrophilic coating | 30 | 30 | 30 | 30 | 30 | 30 |
| (F) Re-emergence of hydrophilic coating | 10 | 10 | 10 | 10 | 10 | 10 |

TABLE 4

| Step | (Scratching resistance) Erosion rate (nm/sec) | | | | | |
|---|---|---|---|---|---|---|
| | PMB50 | PMB60 | PMB70 | PMB80 | PMB90 | PMB80/30 |
| (A) Initial state of base material surface | 2.5 | 2.5 | 2.5 | 2.5 | 2.5 | 2.5 |
| (B) After formation of first hydrophilic coating | 0.6 | 0.4 | 0.2 | 0.1 | 0.1 | 0.6 |
| (C) After immersion of first hydrophilic coating | 2.5 | 2.5 | 2.5 | 2.5 | 2.5 | 2.5 |
| (D) After formation of second hydrophilic coating | 0.6 | 0.4 | 0.2 | 0.1 | 0.1 | 0.6 |
| (E) After removal of second hydrophilic coating | 2.5 | 2.5 | 2.5 | 2.5 | 2.5 | 2.5 |
| (F) Re-emergence of hydrophilic coating | 0.2 | 0.2 | 0.2 | 0.1 | 0.1 | 0.2 |

As seen from the measurement result given above, in the case of using PMB (50 to 90) or PMB 80/30 as a surface treatment material (MPC polymer), immediately after the heat-induced immersion of the MPC polymer (Step (C)), the MPC polymer remains infiltrated in the base material (CLPE). Thus, on the surface of the base material, there is little material which is relatively soft and prone to being damaged (MPC polymer-derived hydrogel layer). This makes is possible to attain high resistance to external damage such as scratching.

After a shift to watery surroundings (Step (F)), the MPC polymer immersed in the base material gradually moves from the amorphous region (layer) lying under the treatment target region toward the surface so as to appear on the surface, forming a hydrophilic thin film (layer) on the surface. In consequence, the resin molded body of Example 4, like those that employ PMBBP, PMBBPH, or PMBPH as described above, exhibits good lubricity and antifouling performance in a living body once again in watery surroundings. Thus, the resin molded body of Example 4 is also capable of hydrophilic coating reproduction that enables restoration of self-lubricating properties and antifouling performance in a living body. That is, after the resin molded body has been implanted in a living body, on impairment of the hydrogel layer conducive to lubrication in the surface of the resin molded body, a similar hydrogel layer (lubricating layer) is re-formed on the surface of the resin molded body in the living body (self-repairing function).

That is, in the resin molded body according to the embodiment made to have "the second hydrophilic coating formed of a hydrophilic copolymer or other hydrophilic resin" formed outside a surface thereof, even on loss of such a hydrophilic coating as subsequently added as described above caused by wear, friction, etc., as long as the resin molded body exists in watery surroundings, as described previously, the hydrophilic copolymer is supplied from the amorphous region onto the surface, with the consequent compensation for the decrease of the hydrophilic coating. Thus, in the resin molded body according to the embodiment made to have a hydrophilic coating formed of a hydrophilic copolymer or other hydrophilic resin formed outside a surface thereof, even if lubricity derived from the hydrophilic coating and water contained in the coating is impaired due to wear and tear, sliding motion, etc., the lubricity can be autonomously restored afterwards. That is, the resin molded body has a self-repairing function.

In the case of using a mixture of two or more copolymers that differ from each other in the mole fraction of MPC in the copolymer, such as the aforenamed PMB 80/30 (3:7), the mixture is preferably obtained by mixing a copolymer (A) in which MPC accounts for 60% or greater but 80% or less, on a mole fraction basis, of the copolymer, and a copolymer (B) in which MPC accounts for 30% or greater but 45% or less, on a mole fraction basis, of the copolymer. The requirement to be fulfilled in the mixing of the copolymer (A) and the copolymer (B) is that the final MPC mole fraction as observed after the mixing be 45% or greater.

The disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description and all changes which come within the meaning and the range of equivalency of the claims are therefore intended to be embraced therein.

The invention claimed is:

1. A resin molded body, comprising:
    a polyolefin element formed of polyolefin, comprising a crystalline region and an amorphous region; and
    a hydrophilic copolymer contained in at least part of a surface of the polyolefin element and in part of the amorphous region that is located below the surface,
    the hydrophilic copolymer comprising a copolymer of 2-methacryloyloxyethyl phosphorylcholine of 45% or greater on a mole fraction basis, and at least one other monomer.

2. The resin molded body according to claim 1,
    wherein, in the hydrophilic copolymer, a mole fraction of 2-methacryloyloxyethyl phosphorylcholine falls within a range of 45% or greater but 90% or less.

3. The resin molded body according to claim 1,
    wherein, in the hydrophilic copolymer, a mole fraction of 2-methacryloyloxyethyl phosphorylcholine falls within a range of 60% or greater but 80% or less.

4. The resin molded body according to claim 1,
    wherein the at least one other monomer comprises methacrylate ester.

5. The resin molded body according to claim 4,
    wherein the at least one other monomer comprises one or two or more substances selected from a methacrylate ester group (X) consisting of methyl methacrylate, butyl methacrylate, benzophenone methacrylate, ethyl methacrylate phosphate, 2-hydroxypropyl methacrylate, 2,3-dihydroxypropyl methacrylate, 3-(4-benzophenyl) oxy-2-hydroxypropyl methacrylate, 4-hydroxybutyl methacrylate, 2-hydroxyethyl methacrylate, sulfobetaine methacrylate, carboxybetaine methacrylate, and ca-oligoethylene glycol monomethacrylate.

6. The resin molded body according to claim 1,
    wherein the polyolefin comprises polyethylene or polypropylene.

7. The resin molded body according to claim 1,
    wherein a static contact angle of atmospheric water with respect to the surface ranges from 1 to 25 degrees.

8. The resin molded body according to claim 1, further comprising:
    a coating formed of a hydrophilic material on the surface of the polyolefin element.

9. A method for producing a resin molded body, the method comprising:
    preparing a polyolefin element formed of polyolefin, the polyolefin element comprising a crystalline region and an amorphous region;
    forming a coating of a hydrophilic copolymer on at least part of a surface of the polyolefin element, the hydrophilic copolymer comprising a copolymer of 2-methacryloyloxyethyl phosphorylcholine of 45% or greater on a mole fraction basis, and at least one other monomer; and
    applying heat treatment to the polyolefin element on which the coating of the hydrophilic copolymer is formed,
    wherein by applying the heat treatment, the coating of the hydrophilic copolymer is immersed through the surface of the polyolefin element into part of the amorphous region located below the surface.

10. The method according to claim 9,
    wherein the hydrophilic copolymer prior to applying the heat treatment comprises an uncrosslinked copolymer having a weight-average molecular weight Mw of a million or less.

11. The method according to claim 9,
    wherein the polyolefin prior to applying the heat treatment comprises ultrahigh-molecular-weight polyethylene having a weight-average molecular weight Mw of at least 3 million.

12. The method according to claim 9,
    wherein the polyolefin element prior to applying the heat treatment comprises an amorphous region layer, and the at least part of the surface of the polyolefin element corresponds to a surface of the amorphous region layer.

13. The method according to claim 12,
    wherein, when the polyolefin element prior to applying the heat treatment is subjected to the applying the heat treatment, at least part of the amorphous region layer is changed into a mixed layer comprising a lamellar crystal-containing crystalline region and an amorphous region.

14. The method according to claim 9, further comprising:
    forming a coating of a hydrophilic material on the at least part of the surface of the polyolefin element after applying the heat treatment.

* * * * *